Patented Feb. 1, 1938

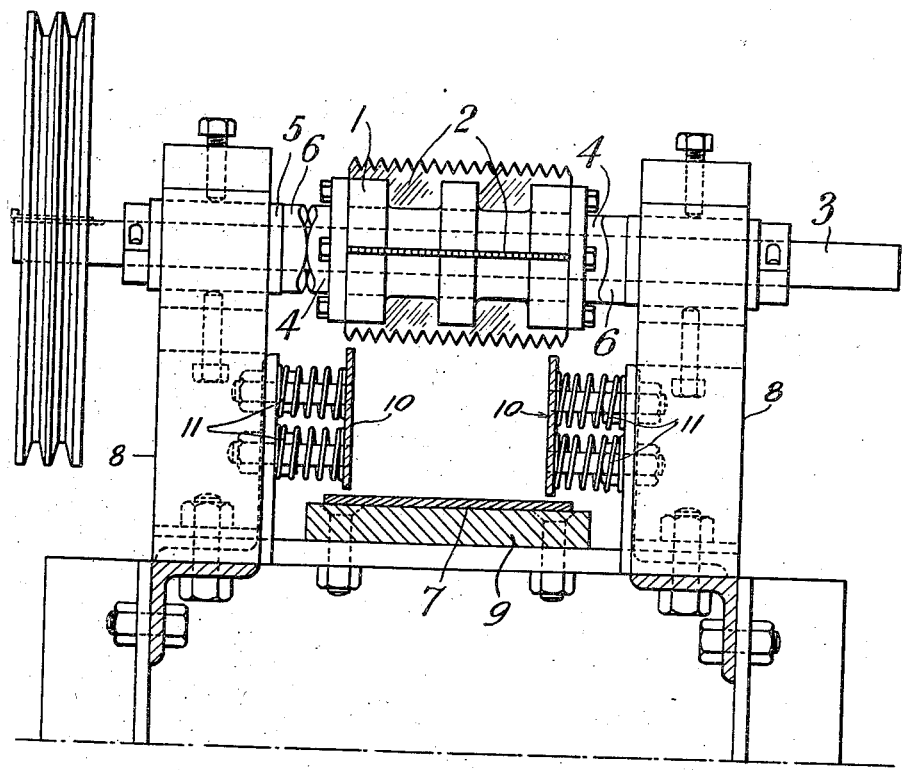

2,107,097

UNITED STATES PATENT OFFICE 2,107,097

MACHINE FOR ROUGHENING BRICKS

Duncan Whitehouse, Mill Hill, London, England

Application January 25, 1937, Serial No. 122,277
In Great Britain January 2, 1936

3 Claims. (Cl. 125—26)

This invention relates to a machine for roughening or patterning bricks or the like, such as tiles or slabs, and more particularly of facing bricks for houses or other buildings.

According to the invention, a roughening or patterning machine for bricks and the like comprises a rotary roughening or patterning tool combined with means for causing same to perform an axial reciprocatory movement, and a conveyor element adapted to feed bricks or the like against said tool.

One embodiment of the invention will now be more particularly described with reference to the accompanying drawing, which shows a part sectional end elevation of the machine.

Referring to the drawing, the rotary roughening or patterning tool comprises a sleeve 1 fitted with a plurality of combs 2 and splined on the driving shaft 3. Secured to each end of the sleeve 1 is a cam member 4 and secured to the bearings 5 of the shaft 1, adjacent the cam members 4 there are respective cam members 6. All cam members have identical undulating end cam tracks and the individual cams (4, 4 or 6, 6) are so mounted on their supports relatively to one another that when on one side the crests of one of the cams (e. g. 4) make contact with the troughs of the cooperating cam (e. g. 6), on the other side the crests of one cam 4 make contact with the crests of the cooperating cam 6. This cam arrangement causes the rotary roughening or patterning tool to perform a smooth axial reciprocatory movement.

The bricks or the like to be roughened or patterned are placed on the conveyor element 7 and fed against the tool 1, 2 which thus traces patterns in the surface of the brick, giving it a rustic appearance. The shape of the pattern may be varied by altering the speeds of the conveyor element and of the rotary and reciprocatory movements of the tool.

The embodiment described is capable of various modifications. Thus, the combs 2 may be substituted by pins studding the sleeve 1, or the sleeve and the combs or pins may be dispensed with and a milling cutter may be employed. The co-operating cams 4, 6 may be omitted on one side and substituted by a spring. If a spring is employed on one side, the cam arrangement on the other side may be altered in any suitable manner. The cam arrangement on the other side may be omitted altogether and substituted by a reciprocatory pusher or piston element. The tool may be disposed with its axis vertically and the bricks or the like may be fed against it on one or both sides.

In addition to the parts heretofore referred to, the machine comprises, according to its present practical embodiment, a suitable base or frame including a pair of spaced supports 8, 8 for the bearings 5, 5, respectively; a conveyor support 9 rigid with said supports 8, 8, and plates 10, 10 carried by the supports 8, 8 for engaging the sides of bricks carried along by the conveyor 7 to hold the bricks against sidewise movement under the influence of scarifying reciprocation of the combs 2, the said plates 10, 10 preferably being mounted for movement toward and away from each other and preferably being spring urged inwardly by springs 11, 11 to accommodate between them bricks of varying widths.

It is found that the roughening or patterning means described give the bricks or the like a very pleasing appearance. With this machine the roughening or patterning of the surfaces of bricks or the like may be effected very rapidly in continuous operation.

I claim:—

1. A machine for roughening the surfaces of bricks comprising a frame including a pair of spaced supports having journal bearings therein, a drive shaft mounted in said journal bearings, a roughening tool splined for longitudinal reciprocation on said shaft, cooperating cam means respectively on the supports and tool for causing reciprocation of the tool on the shaft responsive to rotation of the shaft, and conveying means disposed relative to said tool for feeding bricks across said tool in contact therewith.

2. A machine for roughening bricks comprising a frame including spaced supports, bearings on said supports, a shaft rotatably journaled in said bearings, a roughening tool splined to said shaft bearings, a roughening tool splined to said shaft for rotation therewith and for longitudinal reciprocation thereon, and cam means for causing the reciprocation of said tool, said means including a cam ring fixed to one of the supports and a cooperating cam ring on the tool, and conveying means disposed relative to said tool for feeding bricks across said tool in contact therewith.

3. A machine as set forth in claim 2 including yieldable means on the supports between the tool and the conveying means for holding the bricks against movement by the tool in directions in which the tool by its reciprocation tends to move the bricks.

DUNCAN WHITEHOUSE.